United States Patent
Morimoto et al.

(10) Patent No.: US 8,169,558 B2
(45) Date of Patent: May 1, 2012

(54) LIQUID CRYSTAL DISPLAY DEVICE

(75) Inventors: Masateru Morimoto, Mobara (JP); Junji Tanno, Chiba (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 482 days.

(21) Appl. No.: 12/495,899

(22) Filed: Jul. 1, 2009

(65) Prior Publication Data

US 2010/0002162 A1    Jan. 7, 2010

(30) Foreign Application Priority Data

Jul. 1, 2008   (JP) ................................. 2008-172426

(51) Int. Cl.
*G02F 1/1343* (2006.01)
(52) U.S. Cl. .............................. 349/38; 349/39; 349/139
(58) Field of Classification Search .................... 349/38, 349/39, 139
See application file for complete search history.

(56) References Cited

U.S. PATENT DOCUMENTS 6,747,712 B2 *  6/2004  Noh et al. ....................... 349/39

FOREIGN PATENT DOCUMENTS

| JP | 07-325287 | 12/1995 |
|---|---|---|
| JP | 2000-162627 | 6/2000 |
| JP | 2007-017619 | 1/2007 |

* cited by examiner

*Primary Examiner* — David Nelms
*Assistant Examiner* — David Chung
(74) *Attorney, Agent, or Firm* — Antonelli, Terry, Stout & Kraus, LLP.

(57) ABSTRACT

A liquid crystal display device includes pixels A and pixels B, wherein a width BB of the pixel B is smaller than a width AA of the pixel A. A pixel electrode formed in the pixel B is smaller than a pixel electrode formed in the pixel A in area and hence, capacitance formed between the pixel electrode and a counter electrode which is formed below the pixel electrode with an insulation film sandwiched therebetween becomes small. To eliminate this difference in capacitance, a first branch electrode and a second branch electrode are formed on the pixel electrode of the pixel B thus increasing capacitance between the pixel electrode and the counter electrode. Due to such a constitution, it is possible to prevent the deterioration of image quality attributed to imbalance of capacitance.

6 Claims, 4 Drawing Sheets

LIQUID CRYSTAL DISPLAY DEVICE

CROSS REFERENCE TO RELATED APPLICATION

The present application claims priority from Japanese application JP 2008-172426 filed on Jul. 1, 2008, the content of which is hereby incorporated by reference into this application.

BACKGROUND OF THE INVENTION

1. Field of the Invention

The present invention relates to a display device, and more particularly to a liquid crystal display device which can prevent the occurrence of flickers or the like due to imbalance of capacitance when a size of a pixel is changed for every color such that the whole screen acquires predetermined chromaticity.

2. Description of the Related Art

A liquid crystal display device includes a TFT substrate on which pixel electrodes, thin film transistors (TFT) and the like are formed in a matrix array, a counter substrate which is arranged to face the TFT substrate in an opposed manner and forms color filters or the like thereon at positions corresponding to the pixel electrodes of the TFT substrate, and liquid crystal which is sandwiched between the TFT substrate and the counter substrate. Here, an image is formed by controlling transmissivity of light of the pixel for every pixel by changing the behavior of the liquid crystal molecules.

In general, the liquid crystal display device is formed of pixels of respective colors consisting of red, green and blue, and the respective pixels have the same size. However, depending on a usage of the liquid crystal display device, there may be a case where the whole screen is requested to have particular hue. Alternatively, when the sizes of the pixels of red, green and blue are set equal, there may be a case that complete white cannot be obtained in white display, and color of the screen is deviated to particular hue. In such a case, the correction of hue is required. For this end, there has been proposed a technique which makes a size of a pixel of red, green or blue different from pixels of other colors.

JP-A-2007-17619 (patent document 1) describes the constitution of an IPS (In Plane Switching)—type liquid crystal display device in which transmissivity of a pixel of red, green or blue is changed for adjusting a color tone of a screen.

JP-A-2000-162627 (patent document 2) describes the constitution of a liquid crystal display device where a size of a blue pixel is set larger than a size of a red pixel or a green pixel, and to cope with a drawback caused by a change of capacitance for every pixel when the number of electrodes of blue pixels is increased, a rate between a gate/source capacitance (parasitic capacitance) and the whole capacitance of a TFT is set to a constant value.

JP-A-7-325287 (patent document 3) discloses the constitution of a liquid crystal display device which changes auxiliary capacitance for preventing an image from being influenced by a change of capacitance when a layer thickness of liquid crystal differs depending on a location.

SUMMARY OF THE INVENTION

When sizes of pixel electrodes are changed for bringing a screen into predetermined chromaticity, capacitances relevant to the sizes of the pixel electrodes are also changed. Assuming the total capacitance relevant to an image display as Ct, the total capacitance Ct is expressed by Ct=Clc+Cstg+Cgs. Here, Clc is capacitance generated by a liquid crystal layer, Cstg is capacitance (storage capacitance) generated between a counter electrode (or capacitive electrode) and the pixel electrode, and Cgs is capacitance generated between a gate electrode and a source electrode of a TFT.

The above-mentioned capacitances are particularly relevant to a voltage shift in which a potential of the pixel electrode is changed in response to an ON state or OFF state of the gate voltage. When the size of the pixel is changed for every color, the above-mentioned Ct is changed so that the voltage shift is changed for every color leading to the generation of flickers or the like. With respect to such a change of capacitance, Cstg is particularly largely influenced.

The task of the invention lies in the realization of the constitution which prevents the occurrence of drawbacks such as flickers even when sizes of pixels are changed for every pixel for bringing an image into predetermined chromaticity.

The invention has been made to overcome the above-mentioned drawbacks, and it is an object of the invention to provide a liquid crystal display device which can prevent the occurrence of drawbacks such as flickers by holding Cstg which exerts particularly large influence on image quality at an equal value among the pixels when sizes of pixels are changed for respective colors for adjusting chromaticity. To describe the specific constitutions of the liquid crystal display device, they are as follows.

(1) According to one aspect of the invention, there is provided a liquid crystal display device which includes a first substrate on which pixels are formed in regions surrounded by scanning lines which extend in the first direction and are arranged parallel to each other in the second direction and video signal lines which extend in the second direction and are arranged parallel to each other in the first direction, the pixels being constituted of two kinds of pixels consisting of first pixels having a first area and second pixels having a smaller area than the first pixels, a second substrate which faces the first substrate in an opposed manner and forms color filters and light blocking films thereon, and a liquid crystal layer which is sandwiched between the first substrate and the second substrate, wherein in the first pixel, first capacitance is generated by a first electrode having a slit, an insulation film, and a planar second electrode which is formed below the first electrode with the insulation film sandwiched therebetween, in the second pixel, second capacitance is generated by a first electrode having a slit, a branch electrode branched from the first electrode, an insulation film, and a planar second electrode which is formed below the first electrode with the insulation film sandwiched therebetween, the branch electrode is formed in a state that the branch electrode gets over the video signal line and extends over the neighboring pixel, and an amount of the second capacitance falls within a range of 90% to 110% of an amount of the first capacitance.

(2) In the liquid crystal display device having the above-mentioned constitution (1), the direction that the branch electrode extends falls within a range of 0 degree to 45 degrees in the liquid crystal rotational direction when the voltage is applied to the pixel with respect to the direction orthogonal to the liquid crystal initial alignment direction on the first substrate.

(3) In the liquid crystal display device having the above-mentioned constitution (1), the branch electrode is covered with the light blocking film formed on the second substrate.

(4) In the liquid crystal display device having the above-mentioned constitution (1), in the second pixel, a second branch electrode is further branched from the first electrode having a slit, and the second capacitance is generated by the first electrode having a slit, the branch electrode, the second branch electrode, the insulation film, and the second electrode.

(5) In the liquid crystal display device having the above-mentioned constitution (4), the second branch electrode is formed in a state that the second branch electrode gets over the video signal line and extends over the neighboring pixel.

(6) According to another aspect of the invention, there is provided a liquid crystal display device which includes a first substrate on which pixels are formed in regions surrounded by scanning lines which extend in the first direction and arranged parallel to each other in the second direction and video signal lines which extend in the second direction and are arranged parallel to each other in the first direction, the pixels being constituted of two kinds of pixels consisting of first pixels having a first area and second pixels having a smaller area than the first pixels, a second substrate which faces the first substrate in an opposed manner and forms color filters, a light blocking film and counter electrodes thereon, and a liquid crystal layer which is sandwiched between the first substrate and the second substrate, wherein in the first pixel, first capacitance is generated by a pixel electrode, an insulation film, and a capacitive electrode which is formed below the pixel electrode with the insulation film sandwiched therebetween, in the second pixel, second capacitance is generated by a pixel electrode, an insulation film, and a capacitive electrode which is formed below the pixel electrode with the insulation film sandwiched therebetween, a portion of the pixel electrode of the second pixel is formed in a state that the portion of the pixel electrode gets over the video signal line and extends over the neighboring pixel, and an amount of the second capacitance falls within a range of 90% to 110% of an amount of the first capacitance.

According to the invention, in a method of adjusting chromaticity of an image by making areas of pixels different from each other, among the pixel shaving different areas, storage capacitances generated in the respective pixels are set constant. Alternatively, by setting the storage capacitances to values which fall within a predetermined range, it is possible to alleviate drawbacks such as a voltage shift or the like attributed to the difference in pixel area.

DETAILED DESCRIPTION OF THE PREFERRED EMBODIMENTS

The invention will be described in detail in conjunction with embodiments hereinafter.

Embodiment 1]

A viewing angle characteristic is critically important in a liquid crystal display device. An IPS-type liquid crystal display device is configured to control light which passes through a liquid crystal layer by rotating liquid crystal molecules using a lateral electric field thus exhibiting an excellent viewing angle characteristic. Although there exist various kinds of IPS-type liquid crystal display devices, in this embodiment, the explanation is made with respect to a case in which the invention is applied to an IPS liquid crystal display device where one electrode is formed of a comb-teeth-shaped transparent electrode and another electrode is formed of a matted (planar) transparent electrode.

Figure 1:
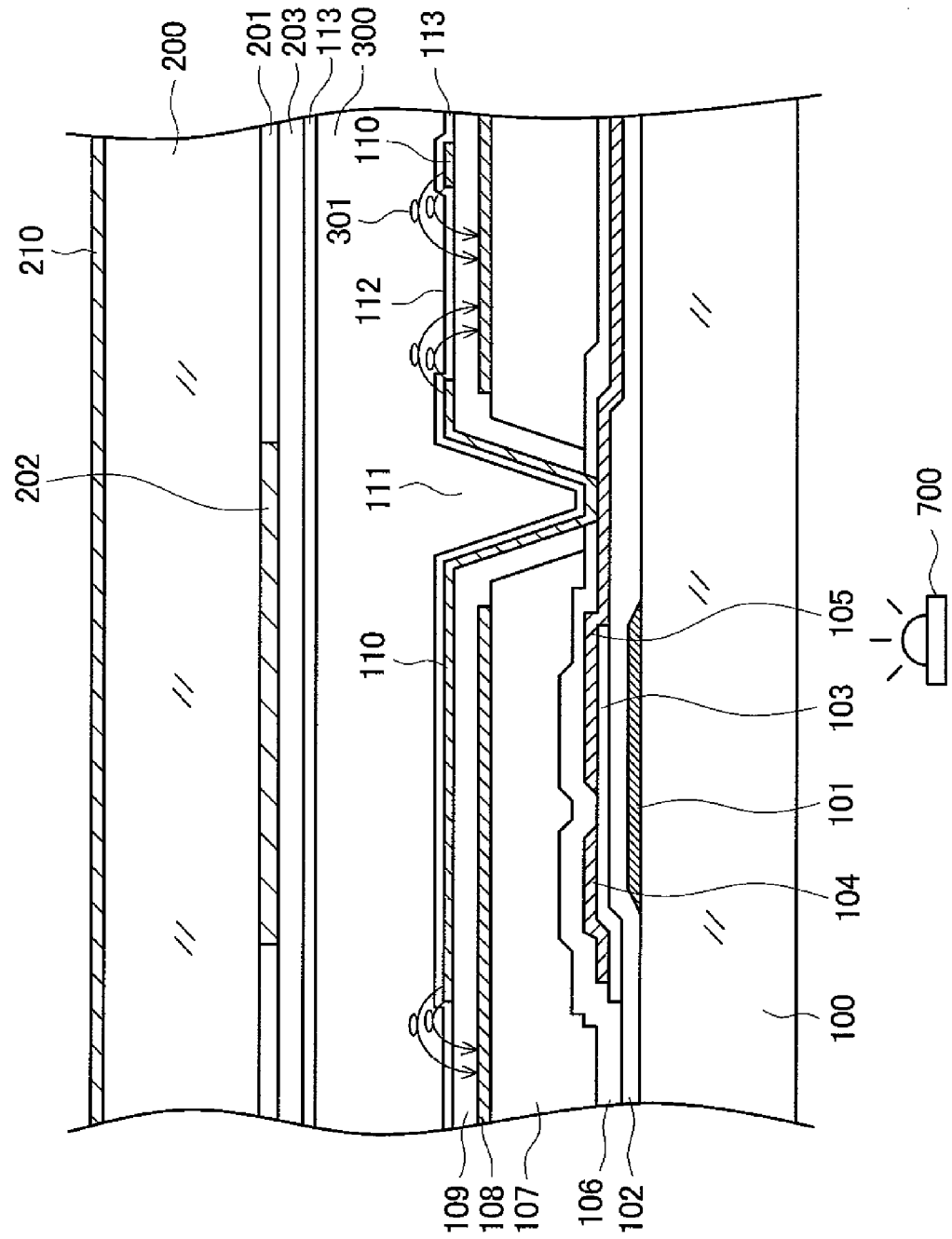
FIG. 1 is a cross-sectional view of a liquid crystal display device according to an embodiment 1 of the invention.

FIG. 1 is across-sectional view of the IPS liquid crystal display device to which the invention is applied. In FIG. 1, gate electrodes 101 are formed on a TFT substrate 100 made of glass. The gate electrodes 101 are formed on the same layer as scanning lines 500. The gate electrodes 101 are formed by stacking an MoCr alloy on an AlNd alloy.

A gate insulation film 102 made of SiN is formed in a state that the gate insulation film 102 covers the gate electrodes 101. Semiconductor layers 103 formed of an a-Si film are formed on the gate insulation film 102 at positions where the semiconductor layers 103 face the gate electrodes 101 in an opposed manner. The a-Si film is formed by a plasma CVD method. The a-Si film constitutes a channel portion of a TFT (thin film transistor), and a source electrode 104 and a drain electrode 105 are formed on the a-Si film with the channel portion in a state that the a-Si film is sandwiched between the gate electrode 101 and the source electrode 104 and the drain electrode 105. Here, an n+Si layer not shown in the drawing is formed between the a-Si film and the source electrode 104 or between the a-Si film and the drain electrode 105. The n+Si layer is provided for forming an ohmic contact between the semiconductor layer 103 and the source electrode 104 or between the semiconductor layer 103 and the drain electrode 105.

A video signal line 600 also functions as the source electrode 104, and the drain electrode 105 is connected to a pixel electrode 110. Both the source electrodes 104 and the drain electrodes 105 are formed on the same layer simultaneously. In this embodiment, the source electrodes 104 or the drain electrodes 105 are made of MoCr alloy. To decrease electric resistance of the source electrode 104 or the drain electrode 105, for example, the electrode structure in which an AlNd alloy layer is sandwiched between MoCr alloy layers is adopted.

The TFTs are covered with an inorganic passivation film (insulation film) 106 made of SiN. The inorganic passivation film 106 is provided for protecting the TFTs, and more particularly the channel portions of the TFTs from impurities. An organic passivation film (insulation film) 107 is formed on the inorganic passivation film 106. The organic passivation film 107 also plays a role of leveling surfaces of the TFTs as well as a role of protecting the TFTs and hence, the organic passivation film 107 is formed with a large thickness. The thickness of the organic passivation film 107 is set to a value which falls within a range from 1 μm to 4 μm.

A photosensitive acrylic resin, a silicon resin, a polyimide resin or the like is used for forming the organic passivation film 107. It is necessary to form a through hole in the organic passivation film 107 at a portion where the pixel electrode 110 and the drain electrode 105 are connected with each other. However, since the organic passivation film 107 is a photosensitive film, the through hole can be formed by exposing and developing the organic passivation film 107 per se without using photoresist.

A counter electrode 108 is formed on the organic passivation film 107. The counter electrode 108 is formed by forming a transparent conductive film made of ITO (Indium Tin Oxide) on the whole display region by sputtering. That is, the counter electrode 108 is formed into a planar shape. After forming the counter electrode 108 on the whole surface of the display region by sputtering, only the counter electrode 108 at a position where the through hole for electrically connecting the pixel electrode 110 and the drain electrode 105 is formed is removed by etching.

An upper insulation film 109 made of SiN is formed in a state that the upper insulation film 109 covers the counter electrode 108. After forming the upper insulation film 109, through holes are formed in the upper insulation film 109 by etching. The through holes 111 are formed by etching the inorganic passivation film 106 using the upper insulation film 109 as a resist. Thereafter, an ITO film from which pixel electrodes 110 are formed is formed by sputtering in a state that the ITO film covers the upper insulation film 109 and the through hole 111. The pixel electrodes 110 are formed by patterning the ITO film which is formed by sputtering. The ITO film from which the pixel electrodes 110 are formed also covers the through holes 111. In the through hole 111, the drain electrode 105 which extends from the TFT and the pixel electrode 110 are electrically connected with each other, and video signals are supplied to the pixel electrode 110 via the through hole 111.

The pixel electrode 110 is formed of comb-teeth-shaped electrodes. A slit 112 is formed between neighboring comb-tooth-shaped electrodes. A reference voltage is applied to the counter electrode 108, and a video signal voltage is applied to the pixel electrode 110. When the voltage is applied to the pixel electrode 110, as shown in FIG. 1, lines of electric force are generated so that liquid crystal molecules 301 are rotated in the direction of the lines of electric force thus controlling the transmission of light radiated from a backlight 700. The transmission of light radiated from the backlight 700 is controlled for every pixel so as to form an image on a screen. Here, an alignment film 113 for aligning the liquid crystal molecules 301 is formed on the pixel electrodes 110.

Figure 2:
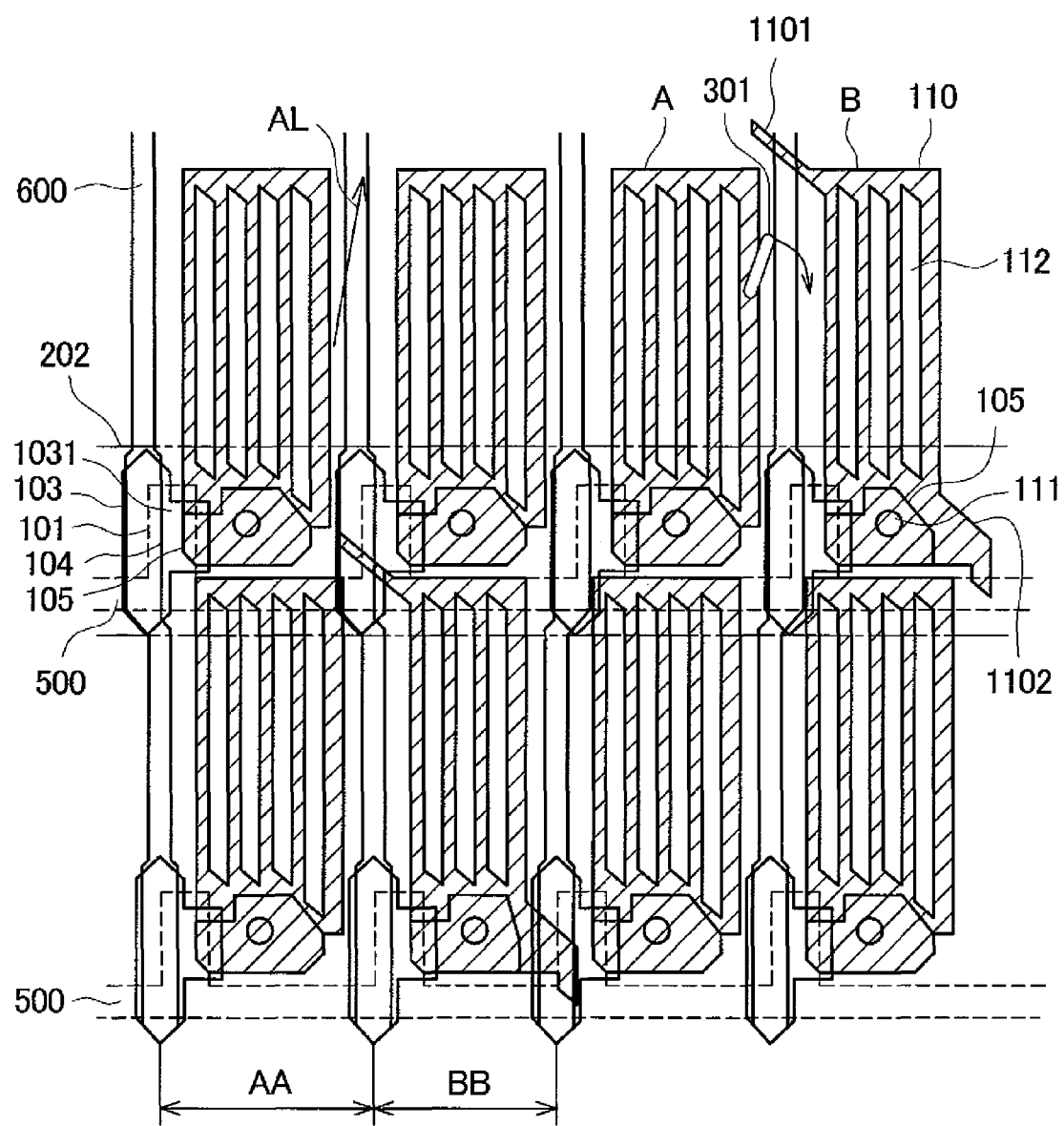
FIG. 2 is a plan view of the pixel constitution according to the embodiment 1.

In FIG. 1, a storage capacitance Cstg is generated between the planar counter electrode 108 and the comb-teeth-shaped pixel electrode 110. The storage capacitance Cstg has a function of alleviating a so-called voltage shift in which a potential of the pixel electrode 110 is influenced when a gate voltage is turned on or off. Changing of a size of the pixel is equal to changing of a size of the pixel electrode 110 and hence, when a size of the pixel is changed, the storage capacitance Cstg is also changed along with the change of the size of the pixel. Accordingly, a value of the voltage shift is changed for every pixel. To prevent such a change, according to the invention, as shown in FIG. 2, branch electrodes are provided to the pixel electrode 110 having a narrow width so as to set a value of the storage capacitance Cstg of the pixel electrode 110 having a narrow width substantially equal to values of storage capacitances of other pixels.

In the example shown in FIG. 1, the counter electrode 108 having a planar shape is arranged on the organic passivation film 107, and the comb-teeth-shaped pixel electrode 110 is arranged on the upper insulation film 109. On the other hand, the pixel electrode 110 having a planar shape may be arranged on the organic passivation film 107, and the comb-teeth-shaped counter electrode 108 may be arranged on the upper insulation film 109. In the explanation made hereinafter, however, it is assumed that an upper comb-teeth-shaped electrode is the pixel electrode 110, and a lower planar matted electrode is the counter electrode 108.

In FIG. 1, a counter substrate 200 is arranged on the TFT substrate 100 with a liquid crystal layer 300 sandwiched therebetween. Color filters 201 are formed on an inner side of the counter substrate 200. The color filters of red, green, blue 201 are formed for every pixel thus forming a color image. A light blocking film 202 is formed between the color filters 201 thus enhancing a contrast of the image. Here, the light blocking film 202 also plays a role of a light blocking film 202 for shielding the TFT from light thus preventing an optical current from flowing into the TFT.

An overcoat film 203 is formed in a state that the overcoat film 203 covers the color filters 201 and the light blocking films 202. The color filters 201 and the light blocking films 202 have an uneven surface respectively and hence, the respective surfaces are leveled by the overcoat film 203. An alignment film 113 which decides an initial alignment of liquid crystal is formed on the overcoat film 203. In FIG. 1, the liquid crystal display device is an IPS liquid crystal display device and hence, the counter electrode 108 is formed on a TFT-substrate-100 side and is not formed on a counter-substrate-200 side.

As shown in FIG. 1, in the IPS liquid crystal display device, a conductive film is not formed on an inner side of the counter substrate 200 side. Accordingly, a potential of the counter substrate 200 becomes unstable. Further, electromagnetic noises enter the liquid crystal layer 300 from the outside and hence, an image is influenced by the noises. To eliminate such drawbacks, a surface conductive film 210 is formed on an outer side of the counter substrate 200. The surface conductive film 210 is an ITO film which is a transparent conductive film and is formed by sputtering.

As shown in FIG. 1, the constitution where liquid crystal is sandwiched between the TFT substrate 100 on which the pixel electrodes 110, the TFTs and the like are formed in a matrix array and the counter substrate 200 on which the color filters 201 and the like are formed is called a liquid crystal display panel. In FIG. 1, a backlight 700 is arranged on a back surface of the TFT substrate 100. Further, although not shown in the drawing, a polarizer is arranged on the back surface of the TFT substrate 100 and a front surface of the counter substrate 200 respectively. A phase difference plate maybe also arranged on the respective surfaces when necessary.

FIG. 2 is a plan view showing the liquid crystal display device of the embodiment 1. In FIG. 2, the scanning lines 500 extend in the lateral direction and are arranged parallel to each other in the longitudinal direction. Further, the video signal lines 600 extend in the longitudinal direction and are arranged parallel to each other in the lateral direction. Regions surrounded by the scanning lines 500 and the video signal lines 600 constitute the pixels.

In FIG. 2, the pixels are constituted of pixels A each of which has a normal size and pixels B each of which is smaller than the size of the pixel A having the normal size. The pixel A has a width AA and the pixel B has a width BB. The arrangement shown in FIG. 2 may be considered such that four pixels form one set or a pair of pixels consisting of pixels which differ in size is arranged at particular pitches.

In FIG. 2, both of the pixel electrode 110 of the normal pixel A and the pixel electrode 110 of the small pixel B are formed of a comb-teeth-shaped electrode having a closed distal end. However, the pixel electrode 110 of the pixel A has five comb teeth portions, while the pixel electrode 110 of the pixel B has four comb teeth portions. The counter electrode 108 not shown in the drawing which is formed in a planar matted manner is formed below the pixel electrodes 110 by way of the upper insulation film 109. The storage capacitance Cstg is generated between the pixel electrode 110 and the counter electrode 108.

A size of the pixel electrode 110 of the pixel B is smaller than a size of the pixel electrode 110 of the pixel A and hence, an amount of storage capacitance Cstg of the pixel B also becomes smaller than an amount of storage capacitance Cstg of the pixel A. Accordingly, a voltage shift differs between these pixels thus causing flickers or the like.

To eliminate the imbalance of the storage capacitance Cstg between the pixels, two branch electrodes consisting of a first branch electrode 1101 and a second branch electrode are provided to the pixel B thus making the storage capacitance Cstg of the pixel B substantially equal to the storage capacitance Cstg of the pixel A. In the pixel B shown in FIG. 2, the first branch electrode 1101 is formed on a left upper portion of the pixel B, and the second branch electrode is formed on a right lower portion of the pixel B. That is, an area of the pixel electrode 110 with which the pixel electrode 110 faces the counter electrode 108 is increased by an amount corresponding to the branch electrodes and hence, the storage capacitance Cstg can be increased.

Assuming an amount of the storage capacitance Cstg of the pixel B as BCstg and an amount of the storage capacitance Cstg of the pixel A as ACstg, it is preferable to set the storage capacitance BCstg within a range of $0.9ACstg \leq BCstg \leq 1.1ACstg$ by providing the first branch electrode 1101 and the second branch electrode 1102 to the pixel B.

In this embodiment, as shown in FIG. 2, the first branch electrode 1101 and the second branch electrode 1102 get over the video signal line 600 and extend over the neighboring pixel. Due to such a constitution, it is possible to ensure a necessary amount of storage capacitance Cstg. Here, in some cases, only either one of the first branch electrode 1101 and the second branch electrode 1102 may be configured to extend over the neighboring pixel. In this case, an extending portion of the electrode is covered with the light blocking film 202 on the counter substrate 200 and hence, the formation of an image is not influenced by the extending portion of the electrode. Further, the number of branch electrodes is not limited to two per one pixel as in the case of this embodiment. That is, the number of branch electrodes may be only one, or three or more per one pixel.

In FIG. 2, the TFT is formed between the video signal line 600 and the pixel electrode 110. In FIG. 2, the gate electrode 101 of the TFT is formed of a portion branched from the scanning line 500. The semiconductor layer 103 is formed so as to cover the gate electrode 101. The video signal line 600 also functions as the source electrode 104 of the TFT. The drain electrode 105 is formed below the pixel electrode 110 in an overlapping manner. A channel portion 1031 is formed between the source electrode 104 and the drain electrode 105. The drain electrode 105 and the pixel electrode 110 are electrically connected with each other via the through hole 111.

In FIG. 2, an arrow AL indicates the rubbing direction which determines the initial alignment direction of liquid crystal. The liquid crystal molecules 301 are aligned along the rubbing direction AL. When a voltage is applied between the pixel electrode 110 and the counter electrode 108, the liquid crystal molecules 301 are rotated as indicated by an arrow. FIG. 2 shows a case in which the rotational direction of liquid crystal when the voltage is applied to the pixel is the clockwise direction.

The first branch electrode 1101 and the second branch electrode 1102 in the pixel B are covered with the light blocking film 202 which is formed on the counter substrate 200 and hence, an image is not influenced by the formation of the first branch electrode 1101 and the second branch electrode 1102. However, to prevent an image from being influenced by a domain generated when a person touches the counter substrate 200, it is necessary to define an angle of the first branch electrode 1101 and an angle of the second branch electrode 1102 with respect to the rubbing direction AL.

Figure 3:
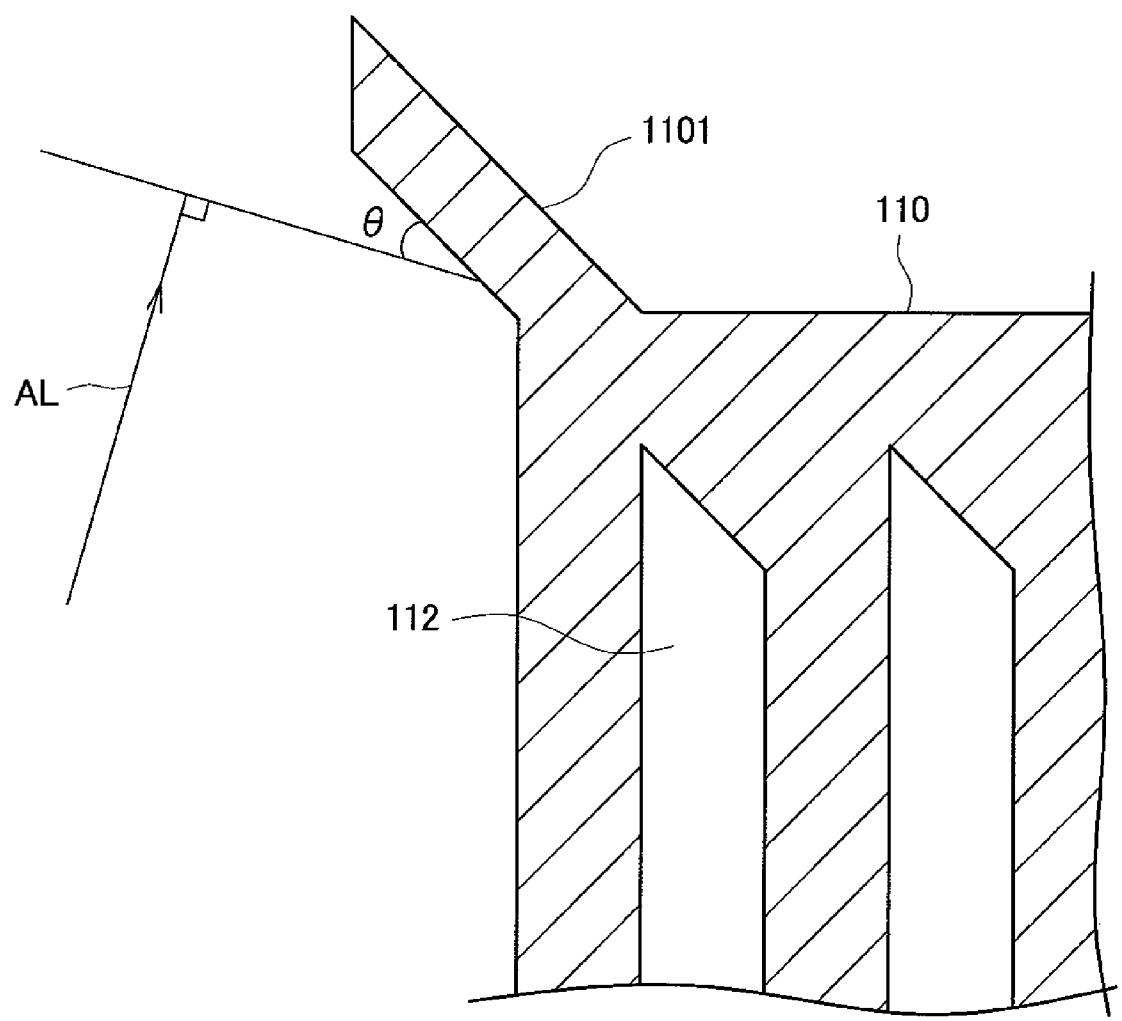
FIG. 3 is a plan view showing a part of a pixel portion in the pixel constitution in detail.

FIG. 3 is a view for explaining the relationship between the angle of the branch electrode and the rubbing direction AL by taking the first branch electrode 1101 in the pixel B as an example. In FIG. 3, the first branch electrode 1101 is branched from the pixel electrode 110 in the pixel B in the leftward and upward direction. An arrow AL in FIG. 3 indicates the rubbing direction. θ is an angle made by the extending direction of the first branch electrode 1101 and the direction orthogonal to the rubbing direction (initial alignment direction of liquid crystal) AL. By setting θ in FIG. 3 to a value which falls within a range from 0 degree to 45 degrees in the liquid crystal rotational direction (clockwise direction in this embodiment) when a voltage is applied to the pixel, it is possible to prevent the generation of domain. Since the liquid crystal rotational direction is determined based on the initial alignment direction of liquid crystal, the extending direction of comb teeth of the pixel electrode 110 or a kind of liquid crystal (positive or negative), there may be a case that liquid crystal rotational direction is set in the counterclockwise direction.

Although FIG. 3 explains the first branch electrode 1101, the same goes for the second branch electrode 1102 formed on a right lower portion of the pixel B. That is, the extending direction of the first branch electrode 1101 and the second branch electrode 1102 are parallel to each other except for the difference that the first branch electrode 1101 is formed on the left upper portion of the pixel B and the second branch electrode 1102 is formed on the right lower portion of the pixel B and hence, a technique used for setting the extending direction of the first branch electrode 1101 is directly applicable to setting of the extending direction of the second branch electrode 1102.

As has been explained above, according to this embodiment, in setting chromaticity of an image by changing areas of pixels, chromaticity of the image can be set without changing a value of Cstg and hence, drawbacks such as flickers can be prevented. Further, according to this embodiment, the first branch electrode 1101 and the second branch electrode 1102 provided for maintaining Cstg at a predetermined value are covered with the light blocking film 202 and hence, the above-mentioned setting of chromaticity of the image can be performed without changing transmissivity of the pixel electrode 110. Further, according to this embodiment, setting of Cstg can be performed by merely adjusting a shape of the pixel electrode 110 of the pixel B having the narrow width. Accordingly, Cstg can be adjusted without pushing up a manufacturing cost.

[Embodiment 2]

This embodiment provides the constitution which can change chromaticity of an image by changing a size of a pixel of particular color from sizes of other pixels with respect to a TN (Twisted Nematic) liquid crystal display device or a VA (Vertical Alignment) liquid crystal display device. Each pixel is, as shown in FIG. 2, formed in a region surrounded by scanning lines 500 and video signal lines 600. Further, in the same manner as the embodiment 1, a width of the pixel sandwiched by the video signal lines 600 is changed so as to change an area of the pixel.

Also in the same manner as the embodiment 1, when the area of the pixel is decreased, the relevant capacitance is changed and hence, there arises a drawback that flickers are generated due to imbalance of capacitance. This embodiment provides the constitution which overcomes this drawback with respect to the TN type liquid crystal display device or the VA type liquid crystal display device.

Figure 4:
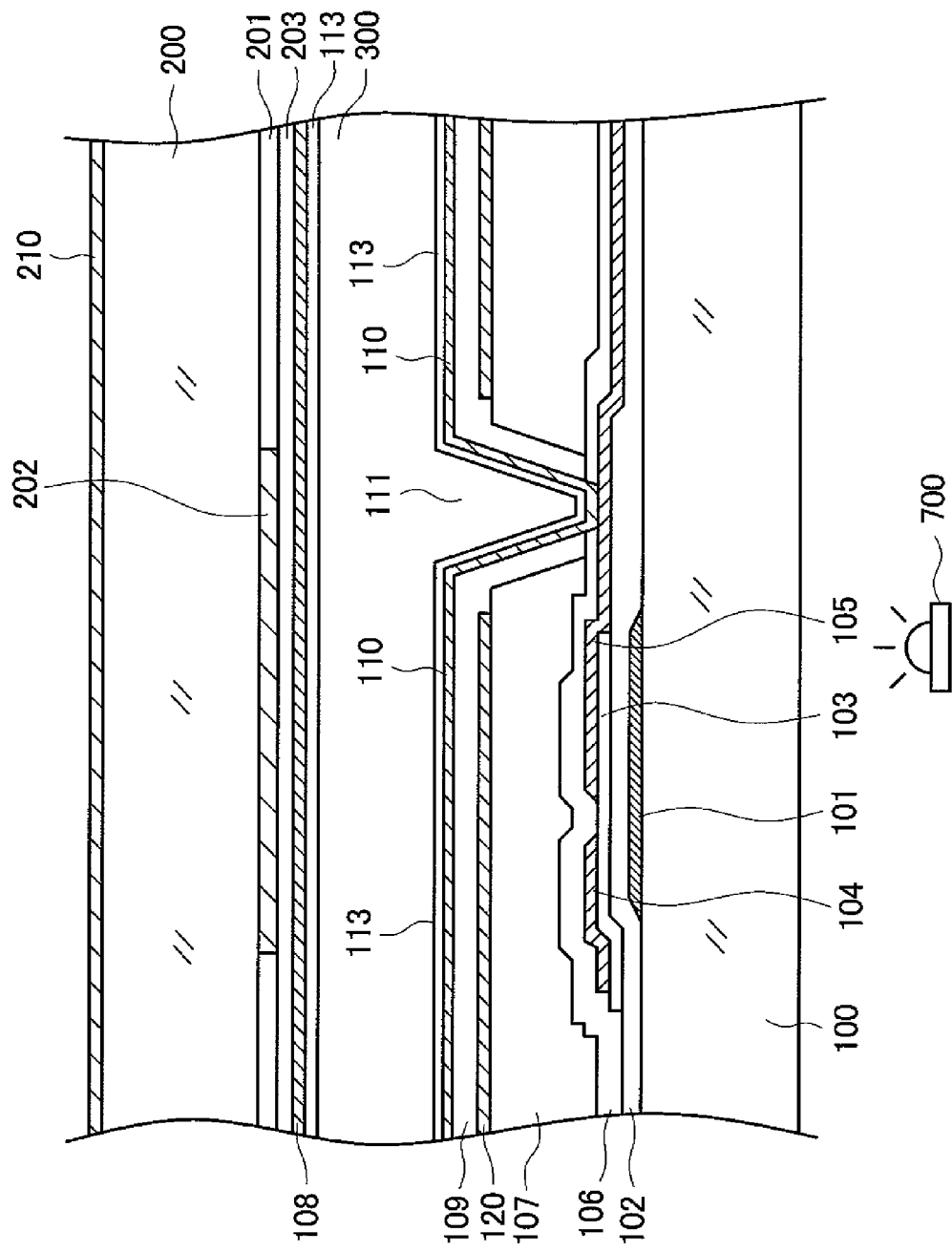
FIG. 4 is a cross-sectional view of a liquid crystal display device of an embodiment 2.

FIG. 4 is across-sectional view showing the liquid crystal display device according to the second embodiment of the invention. FIG. 4 shows the cross-sectional structure which is applicable to the TN-type liquid crystal display device and the VA-type liquid crystal display device in common. Although alignment control projections or the like are formed for aligning liquid crystal at a particular angle in the VA-type liquid crystal display device, the projections or the like are omitted in FIG. 4.

In FIG. 4, pixel electrodes 110 are formed on an upper insulation film 109, and auxiliary capacitance electrodes 120 are formed below the pixel electrodes 110 with the upper insulation film 109 sandwiched therebetween. The auxiliary capacitance electrode 120 is formed of a transparent conductive film. A counter electrode 108 is formed on a counter substrate 200. Due to a vertical electric field generated between the pixel electrode 110 formed on the TFT substrate 100 and the counter electrode 108 formed on the counter substrate 200 in response to a video signal, the inclination of liquid crystal molecules is changed thus controlling light which passes through a liquid crystal layer. A planar shape of the pixel electrode 110 is not a comb-teeth shape but is a planar shape or a shape which is formed by forming slits in portions of a planar shape. Other constitutions in FIG. 4 are substantially equal to the corresponding constitutions shown in FIG. 1 and hence, the explanation of other constitutions is omitted.

As shown in FIG. 4, the auxiliary capacitance electrode is formed below the pixel electrode 110 with the upper insulation film 109 sandwiched therebetween. The storage capacitance Cstg is generated between the pixel electrode 110 and the auxiliary capacitance electrode 120. In this embodiment, by adjusting a facing area of the pixel electrode 110 and a facing area of the auxiliary capacitance electrode 120, capacitance of the pixel having a normal area and the capacitance of the pixel having the decreased area are adjusted. For example, it is possible to adjust the capacitances of the pixels by adjusting an opening area of the auxiliary capacitance electrode 120, by forming another opening in the auxiliary capacitance electrode 120 and by adjusting an opening area of another opening or by changing an area of the pixel electrode 110. Further, for example, the capacitance of the pixel can be adjusted by forming, in the pixel B having a size smaller than a size of the pixel A, a portion of the pixel electrode 110 in a state that the portion gets over the video signal line and extends over the neighboring pixel. In this case, it is desirable to shield a projecting portion constituting a portion of the pixel electrode from light by a light blocking film 202 formed on the counter substrate 200.

In this case, assume the storage capacitance of the pixel having the normal size as ACstg and the storage capacitance of the pixel having the small size as BCstg, in this embodiment, an amount of storage capacitance BCstg is adjusted to a value which falls within a range from 90% to 110% of an amount of storage capacitance ACstg.

In FIG. 4, the auxiliary capacitive electrode 120 is added by one layer to generate the storage capacitance Cstg. However, the storage capacitance Cstg may be adjusted without adding the auxiliary capacitive electrode 120 by one layer. That is, the auxiliary capacitive electrode 120 may be formed on the same layer as the scanning line 500, a through hole for generating the storage capacitance Cstg may be formed in an organic passivation film 107 or the like, and the storage capacitance Cstg may be formed by way of a gate insulation film.

The constitution of the invention which has been described heretofore is not limited to the liquid crystal display device having the usual pixel arrangement in which the red pixel, the green pixel and the blue pixel are arranged parallel to each other, and is also applicable to a liquid crystal display device having the pixel arrangement in which, in addition to the red pixels, the green pixels and the blue pixels as shown in FIG. 2, white pixels which contribute only to the enhancement of brightness of a screen are also formed.

What is claimed is:

1. A liquid crystal display device comprising;
   a first substrate on which pixels are formed in regions surrounded by scanning lines which extend in the first direction and are arranged parallel to each other in the second direction and video signal lines which extend in the second direction and are arranged parallel to each other in the first direction, the pixels being constituted of two kinds of pixels consisting of first pixels having a first area and second pixels having a smaller area than the first pixels;
   a second substrate which faces the first substrate in an opposed manner and forms color filters and light blocking films thereon; and
   a liquid crystal layer which is sandwiched between the first substrate and the second substrate, wherein
   in the first pixel, first capacitance is generated by a first electrode having a slit, an insulation film, and a planar second electrode which is formed below the first electrode with the insulation film sandwiched therebetween,
   in the second pixel, second capacitance is formed by a first electrode having a slit, a branch electrode branched from the first electrode, an insulation film, and a planar second electrode which is formed below the first electrode with the insulation film sandwiched therebetween,
   the branch electrode is formed in a state that the branch electrode gets over the video signal line, and
   an amount of the second capacitance falls within a range of 90% to 110% of an amount of the first capacitance.

2. A liquid crystal display device according to claim 1, wherein the direction that the branch electrode extends falls within a range of 0 degree to 45 degrees in the liquid crystal rotational direction when the voltage is applied to the pixel with respect to the direction orthogonal to the liquid crystal initial alignment direction on the first substrate.

3. A liquid crystal display device according to claim 1, wherein the branch electrode is covered with the light blocking film formed on the second substrate.

4. A liquid crystal display device according to claim 1, wherein in the second pixel, a second branch electrode is further branched from the first electrode having a slit, and the second capacitance is generated by the first electrode having a slit, the branch electrode, the second branch electrode, the insulation film, and the second electrode.

5. A liquid crystal display device according to claim 4, wherein the second branch electrode is formed in a state that the second branch electrode gets over the video signal line and extends over the neighboring pixel.

6. A liquid crystal display device comprising;
   a first substrate on which pixels are formed in regions surrounded by scanning lines which extend in the first direction and arranged parallel to each other in the second direction and video signal lines which extend in the second direction and are arranged parallel to each other in the first direction, the pixels being constituted of two kinds of pixels consisting of first pixels having a first area and second pixels having a smaller area than the first pixels;
   a second substrate which faces the first substrate in an opposed manner and forms color filters, a light blocking film and counter electrodes thereon; and
   a liquid crystal layer which is sandwiched between the first substrate and the second substrate, wherein in the first pixel, first capacitance is generated by a pixel electrode, an insulation film, and a capacitive electrode which is formed below the pixel electrode with the insulation film sandwiched therebetween, in the second pixel, second capacitance is generated by a pixel electrode, an insulation film, and a capacitive electrode which is formed below the pixel electrode with the insulation film sandwiched therebetween, a portion of the pixel electrode of the second pixel is formed in a state that the portion of the pixel electrode gets over the video signal line and extends over the neighboring pixel, and an amount of the second capacitance falls within a range of 90% to 110% of an amount of the first capacitance.

* * * * *